April 11, 1950 M. E. TOBY ET AL 2,503,425
VARIABLE SPEED MOTOR DRIVE MECHANISM
Filed May 13, 1947 3 Sheets-Sheet 2

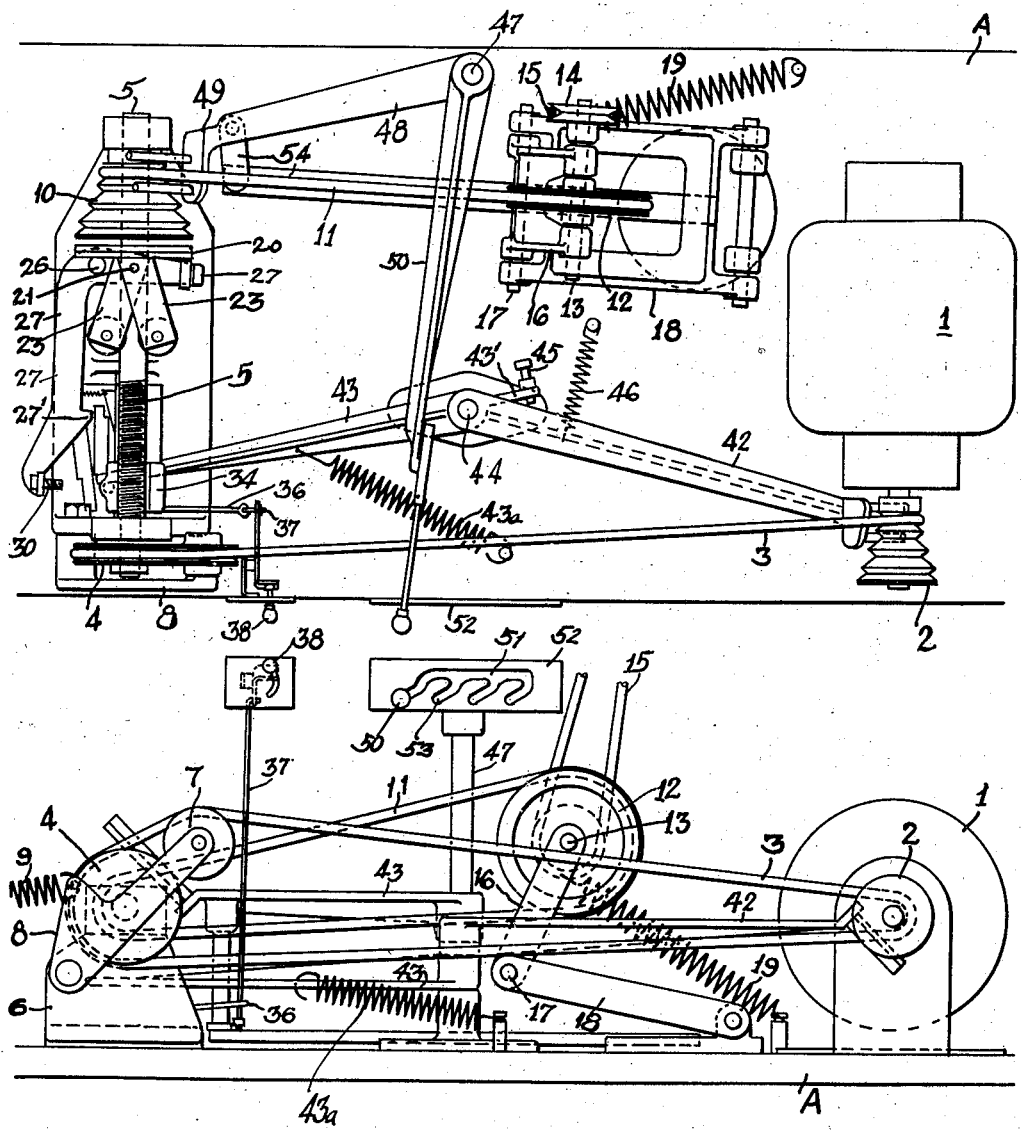

INVENTORS
Max E. Toby and
BY Fred L. Toby
J. E. Pialucco
attorney

April 11, 1950 M. E. TOBY ET AL 2,503,425
VARIABLE SPEED MOTOR DRIVE MECHANISM
Filed May 13, 1947 3 Sheets-Sheet 3
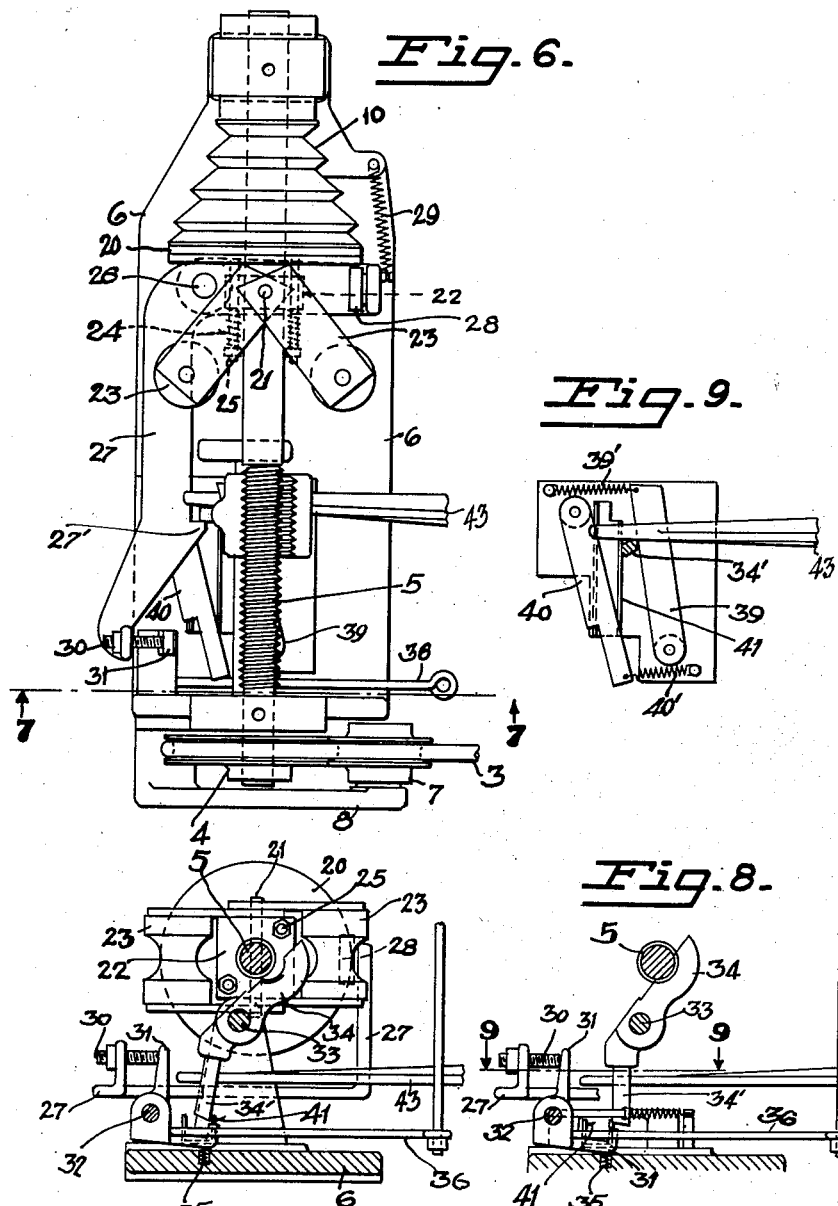
INVENTORS
Max E. Toby
BY Fred L. Toby
J. E. Trabucco
attorney Patented Apr. 11, 1950

2,503,425

UNITED STATES PATENT OFFICE 2,503,425

VARIABLE SPEED MOTOR DRIVE MECHANISM

Max E. Toby and Fred L. Toby, San Francisco, Calif., assignors to Niagara Duplicator Co., a corporation of California Application May 13, 1947, Serial No. 747,754

9 Claims. (Cl. 192—3.5)

This invention relates to an improved variable speed motor drive mechanism.

An object of this invention is to provide an improved variable speed drive mechanism wherein variable speeds are obtainable from a constant speed drive shaft.

Another object of this invention is to provide a variable speed drive mechanism which does not attain full speed immediately but starts slowly and after a predetermined time interval automatically increases in speed until it reaches a maximum pre-set operating speed. The present invention is particularly useful in the operation of high speed stencil duplicators since it is desirable to maintain an initial fairly slow speed to permit the proper stacking of the printed sheets in the receiving tray.

A further object of this invention is to provide an improved variable speed motor drive mechanism wherein a driven belt normally connected to a motor is automatically disconnected therefrom when the mechanism is not in normal operation, thereby making it possible to manually operate or adjust the device to which the driven belt is normally connected without stopping the motor.

Other and further objects of this invention will be pointed out hereinafter, or will be indicated in the appended claims, or will be obvious to one skilled in the art upon an understanding of the present disclosure. For the purpose of this application we have elected to show herein certain forms and details of a variable speed drive mechanism representative of the invention; it is to be understood, however, that the embodiment of our invention herein shown and described is for purposes of illustration only and is not to be regarded as exhaustive of the variations of the invention.

In the accompanying drawings:

Fig. 1 is a top plan view of our variable speed drive mechanism showing it in a neutral or stopped position.

Fig. 2 is front elevation of the mechanism;

Fig. 6 is a top plan view of the mechanism in a high speed operating position;

Fig. 7 is a sectional view taken on the line 7—7 of Fig. 6;

Fig. 8 is a diagrammatic view showing the position of the belt shifting member when functioning to increase the speed of the mechanism; and Fig. 9 is a diagrammatic view taken on line 9—9 of Fig. 8.

Figure 4:
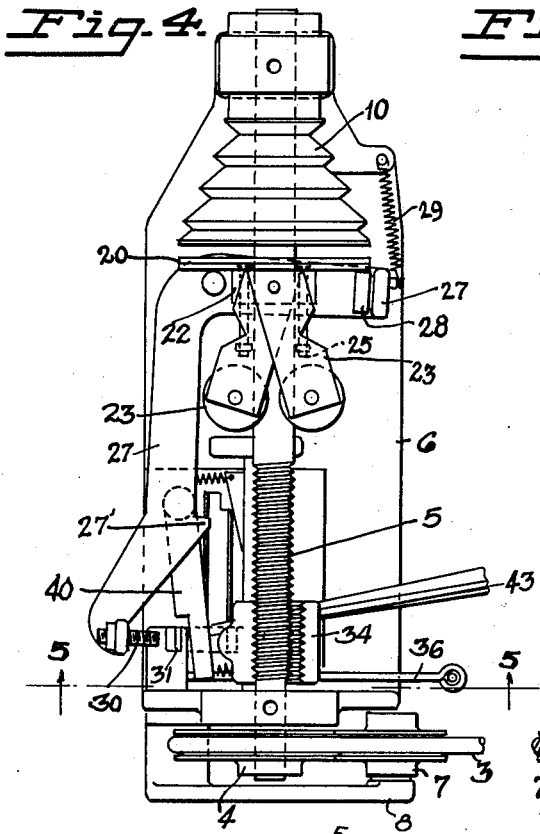
Fig. 4 is a top plan view of the mechanism illustrated in Fig. 3, showing it when stopped.
Figure 3:
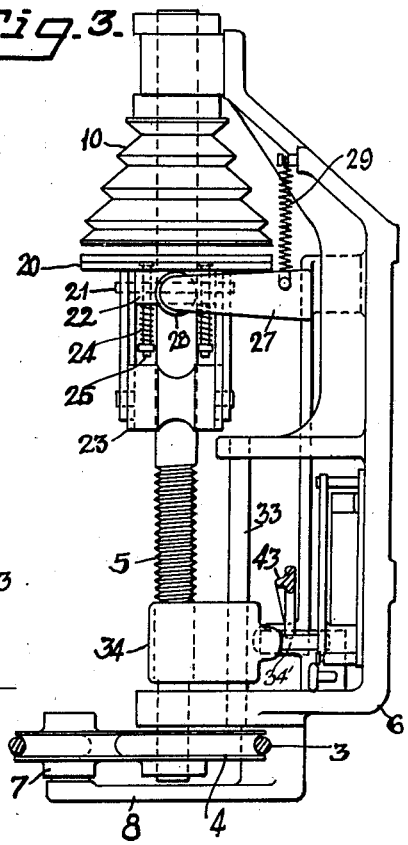
Fig. 3 is an enlarged front elevation of a part of the mechanism, showing in particular, the speed control means.
Figure 5:
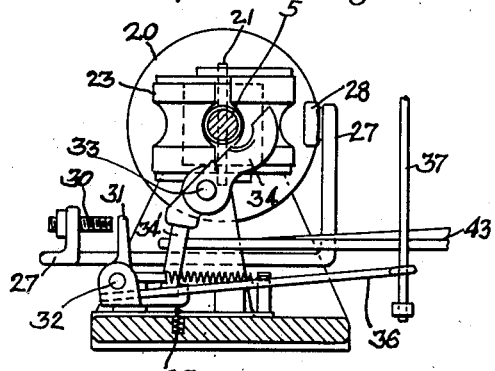
Fig. 5 is a sectional view taken on the line 5—5 of Fig. 4.

Referring to the drawings, A designates a base support on which is mounted an electric motor 1 having a stepped and grooved driving pulley 2 secured to its shaft. The stepped pulley 2 is connected by a drive belt 3 to a single-groove pulley 4 secured to the front end of a partially threaded shaft 5 which is journalled on a frame 6. An idler pulley 7 carried on a pivoted member 8 which is mounted on the frame 6, is arranged in engagement with the belt 3. A helical tension spring 9 connected to the pivoted member 8 urges the latter in a direction whereby the idler pulley 7 provides a suitable tension on the drive belt 3 for its operation.

Mounted for independent rotation on the rear end of the shaft 5 is a drive stepped pulley 10 which is connected by a belt 11 to a pulley 12, the latter being secured to a counter shaft 13. Secured to and rotatable with the counter shaft is a pulley 14 which in ordinary practice is connected by a drive belt 15 or other means to the machine to be operated. The counter shaft 13 is rotatably carried by two spaced but rigidly connected arms 16 which are pivotally connected as at 17 to rigidly connected links 18 that are pivotally anchored to the base support A. One or more helical tension springs 19 connected to and arranged between the links 16 and the base support provides a suitable tension on the belt 11. The belts 3 and 11 are preferably circular in cross section.

Slidably mounted on and suitably secured for rotation with the shaft 5 is a clutch plate 20 which is arranged for operative engagement with the forward face of the stepped pulley 10. Secured by a pin 21 to the shaft 5 is a block 22 on which is pivotally mounted by means of this same pin a pair of governors 23. The governors are so constructed and arranged that when they are moved outwardly by centrifugal force as the shaft 5 rotates, they shift the clutch plate 20 into frictional engagement with the pulley 10 and thereby effect the operative connection of the pulley and the shaft. When the governors 23 are in at-rest position adjacent the shaft 5 the clutch plate 20 is automatically returned to a disengaged position with respect to the pulley 10 by means of a pair of helical springs 24 which are carried on pins 25 slidably extending through the block 22, the said pins being connected at their rear ends to the clutch plate 20. The helical springs 24 are each arranged with its opposite ends in engagement with the block 22 and with an abutment such as a nut on the forward end of each pin 25. When the clutch plate 20 is moved rearwardly by the governors 23 the springs 24, are compressed sufficiently to return the clutch plate to a neutral position when the shaft's rotation is stopped and the governors move back to their at-rest position.

Pivotally mounted on the frame 6 as at 26 is a lever 27 having a roller 28 mounted on its rear end which is normally held in engagement with the forward side of the clutch plate 20 by a helical tension spring 29 connected to the rear end of the said lever. The forward end of the lever 27 carries an adjustable screw 30 which is in engagement with an upstanding part of a pivoted L-shaped restraining member 31, the said member being pivotally supported on the frame 6 as at 32.

Slidably mounted on a horizontal guide rod 33 which is in parallel relationship with the shaft 5 is a half-nut control or actuator element 34 having an upper threaded portion arranged for operative engagement with the threaded portion of the shaft 5. The half-nut actuator element 34 has a depending portion 34' which is adapted to be engaged by an upturned flange on the lower part of the L-shaped restraining member 31 when the said actuator element is in its forward position and the lever member 27 has not been moved by its spring 29 in a direction which will cause the downward movement of the said lower flanged end of the restraining member. The lower or flanged portion of the restraining member 31 is urged upwardly by a compression spring 35 and the said flanged portion is thereby held in an engaging position with the said depending portion 34' of the actuator element 34 when the latter is in its extreme forward position. When so engaged by the restraining member 31 the half-nut actuator element 34 is held in a spaced inoperative position with respect to the shaft 5. The pull exerted by the spring 29 on the lever member 27 is greater than the upward pressure exerted by the spring 35 on the restraining member 31, thus making it possible for the lever member to be pivotally moved when the clutch plate 20 is shifted rearwardly, to tilt the lower portion of the restraining member 31 to a disengaged position with respect to the depending portion 34' of the half-nut actuator element 34.

Secured to and tiltable with the restraining member 31 is a connecting rod 36 which is connected through suitable link means 37 to a hand control lever 38. The hand control lever 38 extends to the front side of the cabinet housing the mechanism, and its manual adjustment in an upward direction to increase the speed of the mechanism will cause the restraining member 31 to be turned in a clockwise direction to release the depending portion 34' of the half-nut actuator element 34.

The depending portion 34' of the actuator element 34 is positioned between two obliquely arranged pressure bars 39 and 40, the former being pivoted at its forward end and the latter at its rear end. A spring 39' connected to the free end of the pressure bar 39 urges the latter to the left, while a spring 40' connected to the free forward end of the pressure bar 40 urges the latter to the right (Fig. 9). The pressure bars 39 and 40 are so arranged that when the depending portion 34' of the actuator element is carried rearwardly it will gradually move the free end of the pressure bar 39 to the right and thereby extend and increase the tension of the spring 39' which will cause the pivotal movement of the actuator element to a disengaging position with respect to the shaft 5 when the said actuator element is free to be so pivotally moved. An elongated guide 41 which is substantially U-shaped in cross-section is arranged to engage with the depending portion 34' of the actuator element 34 and hold the latter in an operative engaged position with respect to the shaft 5 as the said actuator element is moved rearwardly through the rotation of the said shaft. The length of the guide 41 is such that when the actuator element 34 has traveled rearwardly to a certain position, the depending portion 34' thereof will ride from the rear end of the said guide and will be released, thereby allowing the pressure bar 39 through its spring 39' to pivotally move the said actuator element to a disengaged inoperative position with respect to the shaft 5. As the actuator element 34 is moved forwardly by means which will be presently described, the depending portion 34' thereof will engage with the pressure bar 40, and the latter will then be primed through the extension of its spring 40' to return the said depending portion to a position at the right side of the guide 41, preparatory to the next speed increasing operation. It will be noted, however, that the restraining member 31 will be positioned to engage with the depending portion 34' of the actuator element 34 as the pressure bar 40 moves the said portion to the right, providing the hand control lever is in a down or low speed position, or providing the mechanism has been stopped. It is also to be noted when the rotation of the shaft 5 is stopped that the combined forward pressures exerted on the clutch plate 20 by the springs 24 is greater than the pressure exerted by the springs 29 in a rearward direction on the lever member 27, thus making it possible for the clutch plate to be automatically disengaged from the pulley 10 and the restraining member 31 pivotally moved in a counter-clockwise direction (Fig. 7), to a position for engagement with the depending portion 34' of the actuator element 34.

The means employed for automatically positioning the belt 3 in different grooves of the stepped pulley 2 to increase or decrease the speed of the mechanism comprises a shift fork 42 and a lever 43 which are pivotally mounted on the base support A by means of a common pivot member 44. The belt 3 operates between the two opposing forks of the shift fork 42, and when the said fork is moved in a forward direction it will shift the belt to a groove of the pulley having an increased diameter, thereby increasing the speed of rotation of the shaft 5. A shift of the belt 3 in the opposite direction to a groove of lesser diameter decreases the speed of rotation of the shaft. The free end of the lever 43 is in engagement with the rear side of the depending portion 34' of the actuator element 34, and a helical tension spring 43a is arranged to exert a forward pull on the lever, thereby providing means for returning the actuator element to its forward inoperative position when it is free to so move. The lever and the shift fork are mounted for independent pivotal movement, but the lever has an extension 43' at its pivoted end which carries an adjustable screw member 45 which is arranged for engagement with the shift fork when the said lever is pivotally moved rearwardly a predetermined distance by the movement of the actuator element 34 in the same direction (Fig. 1). A helical tension spring 46 is connected to the shift fork 42 and arranged to exert a rearward pull on the latter, but the forward pull on the lever 43 is considerably greater than the rearward pull on the shift fork since the tension spring 43a is required to move the actuator element 34 as well as the lever in a forward direction, while the spring 46 is only required to return the shift fork rearwardly to its neutral position.

The lever 27 is formed with a projection 27' which is arranged to intercept the depending portion 34' of the half-nut actuator element after it has moved rearwardly past the end of the guide 41 and is partially actuated in a forward direction by lever 43. When the actuator element 34 is thus intercepted and held in a rearward position by the projection 27', the clutch plate 20 will be in operative engagement with the pulley and the lever-shift fork combination will have shifted the belt 3 to the groove of the pulley 2 having the largest diameter. In such a position the mechanism will be operated at high speed. It will be noted that as long as the motor is in operation and the belt is connecting the groove of the pulley 2 having the largest diameter with the pulley 4 of the shaft 5, the mechanism will be operating at high speed. With the opening of the switch to the motor 1 the shaft's operation is stopped, thereby causing the governors 23 to move toward the shaft and allow the clutch plate 20 to move forwardly. With the forward movement of the clutch plate the lever 27 is pivotally moved to a position whereby its projection 27' is released from the depending portion 34' of the actuator element 34, thus permitting the lever 43 to move the actuator element forwardly to its initial position. At the same time the lever 43 is moving forwardly, the shift fork 42 is being moved by its associated spring 46 in a rearward direction, thereby returning the belt 3 to its initial position in which it engages with the groove of the pulley 2 having the smallest diameter.

It will be noted that by shifting the control member 38 to a high speed position after the motor's operation is commenced there will be an interval of time elapse before the mechanism has attained its high speed, this being due to the fact that the movement of the actuator element 34 rearwardly along the shaft 5 requires a certain period of time. Such an interval between the commencement of the motor's operation and the attainment of high speed will enable the machine which is operated to complete a certain number of operations.

The means for shifting the belt 11 along the stepped pulley 10 to provide additional operating speeds consists of a vertical rod 47 journalled in the base support A having an arm 48 fixed thereto, the said arm carrying a forked member 49 which is arranged to engage the belt 11. Also fixed to the rod 47 is a radial control arm 50 which extends to the forward side of the cabinet in which the mechanism is housed. The arm 50 extends through a horizontal slot 51 in a plate 52, the said slot having downwardly extended spaced extensions 53 for receiving the arm, the said extensions corresponding to the different steps of the pulley 10, whereby the setting of the belt 11 may be determined. The arms 48 and 50 are connected by links 54 to the rigidly connected links 18. The tension spring 19 is arranged to also urge the forked member 49 toward the smaller end of the stepped pulley 10, and the extensions 53 are suitably positioned to normally retain the arm 50 in the particular extension in which it was manually placed.

What we claim is:

1. In a variable speed motor drive mechanism, a driving shaft having a threaded portion, a clutch member slidably mounted on the shaft and arranged to rotate therewith, a driven member positioned for engagement with the clutch member, governor means pivotally mounted on the shaft for sliding the clutch member into engagement with the driven member when the shaft rotates, spring means for disengaging the clutch member from the driven member when the shaft is at rest, a threaded actuator pivotally mounted for operative engagement with the threaded portion of the driving shaft, means for pivotally moving the actuator into operative relation with the driving shaft when the clutch member is moved into engagement with the driven member, whereby the actuator may be moved longitudinally with respect to the shaft, a stepped drive pulley having a series of belt grooves of gradually increasing diameters and connected to a source of power, a driven pulley connected to the driving shaft, a drive belt operatively connecting the stepped drive pulley and the driven pulley, and belt shifting means actuated by the actuator for shifting the belt to successive grooves in the drive pulley having increased diameters as the said actuator is moved longitudinally by the driving shaft, means for returning the actuator to its original position when the rotation of the driving shaft is disconnected, and means for moving the belt shifting means in the opposite direction to position the belt in grooves of the drive pulley having decreasing diameters.

2. In a variable speed drive mechanism, a driving shaft having a threaded portion, a clutch member shiftably mounted on and rotatable with the shaft, a driven member positioned for engagement with the clutch, governor means carried by the shaft for shifting the clutch member into engagement with the driven member when the shaft rotates, means for shifting the clutch member to a disengaged position with respect to the driven member when the shaft discontinues rotating, a threaded actuator positioned for operative engagement with the threaded portion of the shaft, the said actuator when engaging with the shaft being arranged to travel along the shaft in a direction toward the clutch member when the shaft is rotating, a driven pulley secured to the shaft, a stepped drive pulley having a series of belt grooves of gradually increasing diameters, a drive belt operatively connecting the driven and stepped pulleys, means for rotating the drive pulley, means actuated by the clutch member as it shifts into engagement with the driven member for moving the actuator into operative relation with the shaft, whereby the actuator may be moved along the shaft toward the clutch member as the shaft rotates, belt shift means associated with and operable by the actuator when the latter travels toward the clutch member, whereby the belt is shifted to successive grooves in the driving pulley having increased diameters, and means for returning the actuator to its original position when the rotation of the shaft is discontinued, the said belt shift means being constructed and arranged to shift the belt successively to grooves of the drive pulley having decreasing diameters when the actuator is returned to its original position.

3. In a variable speed drive mechanism, a driven member, a driving shaft having a threaded portion, a clutch member shiftably mounted on and rotatable with the shaft, governor means carried by the shaft for shifting the clutch member into engagement with the driven member when the shaft rotates, means for shifting the clutch member to a disengaged position with respect to the driven member when the shaft's rotation is discontinued, a threaded actuator positioned for operative engagement with the threaded portion of the shaft, the said actuator when engaging with the rotating shaft being arranged to travel along the threaded portion of the shaft toward the clutch member, a driven pulley secured to the shaft, a stepped drive pulley having a series of belt grooves of gradually increasing diameters, a drive belt operatively connecting the driven and the stepped pulleys, means actuated by the clutch member as the latter shifts into operative relation with the driven member for moving the actuator into operative engagement with the shaft, whereby the actuator may be moved along the shaft toward the clutch member as the shaft rotates, belt shift means associated with and operable by the actuator when the latter travels toward the clutch member, whereby the belt is shifted to successive grooves in the driving pulley having increased diameters to increase the speed of rotation of the shaft, means for disconnecting the actuator from the shaft after it has travelled for a certain distance along the threaded portion of the shaft and the belt has been shifted to the groove having the largest diameter, means controlled by the clutch member for holding the actuator in a position near the point of its disengagement from the shaft, whereby the belt shift means is held in a position with the belt in the groove of the drive pulley having the largest diameter, the said last mentioned means being shiftable by the clutch member when the shaft's operation is discontinued, whereby the actuator is released, and spring means for returning the actuator and the belt shift means to their original positions, whereby the belt is shifted to a groove of decreased diameter.

4. In a variable speed drive mechanism, a driving shaft having a driven pulley on one end and a clutch member on its opposite end, the said shaft having a threaded portion, a stepped drive pulley having a series of belt grooves of gradually increased diameter, a drive belt connecting the drive and the driven pulleys, a driven member arranged for engagement with the clutch member, governor means on the shaft for shifting the clutch member into operative engagement with the driven member as the shaft rotates, belt shift means for shifting the belt from one groove of the drive pulley to another, whereby the speed of rotation of the shaft may be increased or decreased, an actuator operatively engaging with the belt shift means and having a threaded portion engaging with the threaded portion of the shaft, whereby the actuator may be moved along the shaft as the shaft rotates to move the belt shift means and shift the belt from a groove of lesser diameter to a groove of increased diameter, means for disengaging the actuator from the shaft, means for returning the actuator to its original position, and means operable when the actuator is returned to its original position for moving the belt shift means to shift the belt from a groove of increased diameter to a groove of lesser diameter.

5. In a variable speed drive, a driven member, a driving shaft having a threaded portion, a shiftable clutch member carried by the driving shaft and arranged for operative engagement with the driven member, governor means carried by the shaft for shifting the clutch member into engagement with the driven member as the shaft rotates, means for disengaging the clutch member from the driven member when the rotation of the shaft is discontinued, a stepped driving pulley having a series of belt grooves of increasing diameter, a driven pulley secured to the shaft, a drive belt connecting the driven and the driving pulleys, belt shift means for advancing the belt gradually from one groove to another groove of increased diameter, a threaded actuator engageable with the threaded portion of the shaft and arranged to be moved longitudinally along its threaded portion when the shaft rotates, the said actuator and the belt shift means being cooperatively arranged so the belt shift means is actuated to advance the belt to grooves of increasing diameters when the actuator is in engagement with and is moved along the shaft in a certain direction, means operatively associated with the clutch member and the actuator for bringing the actuator into operative engagement with the shaft when the clutch member is shifted to an engaging position with the driven member, whereby the actuator may be moved along the shaft in a certain direction, means for disengaging the actuator from the shaft when the actuator has travelled a predetermined distance along the shaft, means controlled by the clutch member for engaging with the actuator as it is disengaged from the shaft and releasably holding the same against a return movement in the opposite direction, the said means being arranged for movement to a released position with respect to the actuator when the rotation of the shaft is discontinued, whereby the actuator is free to move in a reverse direction to its original position and means for moving the actuator in the said reverse direction, the belt shift means and the actuator being cooperatively arranged so the belt is shifted to grooves in the driving pulley of lesser diameter as the actuator moves in said reverse direction.

6. In a variable speed drive mechanism, a driving shaft having a threaded portion, a clutch member carried by the shaft and arranged for movement into and out of engagement with a driven member, governor means on the shaft for actuating the clutch member into operative engagement with the driven member as the shaft rotates, means for actuating the clutch member to a disengaged position with respect to the driven member when the rotation of the shaft is discontinued, a threaded actuator engageable with the threaded portion of the shaft and arranged for longitudinal movement along the shaft when the latter rotates, means operatively associated with the clutch member and the actuator for shifting the actuator into operative engagement with the shaft when the clutch member is moved into operative engagement with the driven member, whereby the actuator may be moved longitudinally along the shaft as the shaft rotates, means for disengaging the actuator from the shaft when the said actuator reaches a certain point thereon, and means for returning the actuator in the opposite direction to its original position.

7. In a variable speed drive mechanism a driving shaft having a threaded portion, a clutch member carried by the shaft and arranged for movement into engagement with the driven member when the shaft is rotated and out of engagement with a driven member when the shaft's rotation is stopped, governor means on the shaft for actuating the clutch member into operative engagement with the driven member as the shaft rotates, means for actuating the clutch member to a disengaged position with respect to the driven member when the rotation of the shaft is discontinued, a threaded actuator engageable with the threaded portion of the shaft and arranged for longitudinal movement along the shaft when the latter rotates, means operatively associated with the clutch member and the actuator for shifting the actuator into operative engagement with the shaft when the clutch member is moved into operative engagement with the driven member, whereby the actuator may be moved longitudinally along the shaft, means for disengaging the actuator from the shaft when the actuator reaches a certain point thereon, means controlled by the clutch member for intercepting and releasably holding the actuator as it is disengaged from the shaft, the said last mentioned means being released from engagement with the actuator when the shaft's rotation is discontinued, and means for returning the actuator in the opposite direction to the original position.

8. In a variable speed drive mechanism, the combination set forth in claim 7, together with a speed change mechanism operatively associated with the shaft and the actuator and operable in accordance with the movement of the actuator in one direction to increase the speed of rotation of the shaft and to decrease the shaft's rotation when the actuator returns in the opposite direction.

9. In a variable speed drive mechanism, a driving shaft having a threaded portion, a clutch member shiftably carried on the shaft, means for shifting the clutch member into engaged relation with a driven member when the shaft rotates, means for disengaging the clutch member from the driven member when the shaft discontinues rotating, a threaded actuator arranged for operative engagement with the shaft and for movement in one direction along the shaft as the shaft rotates and in the opposite direction when the rotation of the shaft is discontinued, and control means associated with the clutch member and the actuator for moving the actuator into operative engagement with the rotating shaft when the clutch member is shifted into engagement with the driven member, whereby the actuator is moved in a certain direction along the shaft as the shaft rotates, means for disengaging the actuator from the shaft upon the actuator reaching a certain point on its threaded portion, the said control means being arranged to intercept the actuator as it is disengaged from the shaft and releasably hold the actuator against return movement along the shaft and the said control means being arranged to release the actuator when the shaft is stopped and the clutch member is shifted to a disengaged position with respect to the driven member, means for moving the actuator in a reverse direction when released, and a speed change mechanism operatively connected to the shaft and controllable by the actuator, the said mechanism being operable to increase the speed of rotation of the shaft when the actuator is moved by the shaft along its threaded portion in a certain direction and operable to decrease the speed of rotation of the shaft when the actuator is moved in a reverse direction.

MAX E. TOBY.
FRED L. TOBY.

REFERENCES CITED

The following references are of record in the file of this patent:

UNITED STATES PATENTS

| Number | Name | Date |
| --- | --- | --- |
| 1,074,599 | Bradley | Oct. 7, 1913 |
| 1,212,110 | Rogister | Jan. 9, 1917 |
| 1,731,246 | Hildebrandt | Oct. 15, 1929 |
| 2,179,841 | Cassidy | Nov. 14, 1939 |